J. RIGHTER.
Cultivator.
No. 18,928.
Patented Dec. 22, 1857.
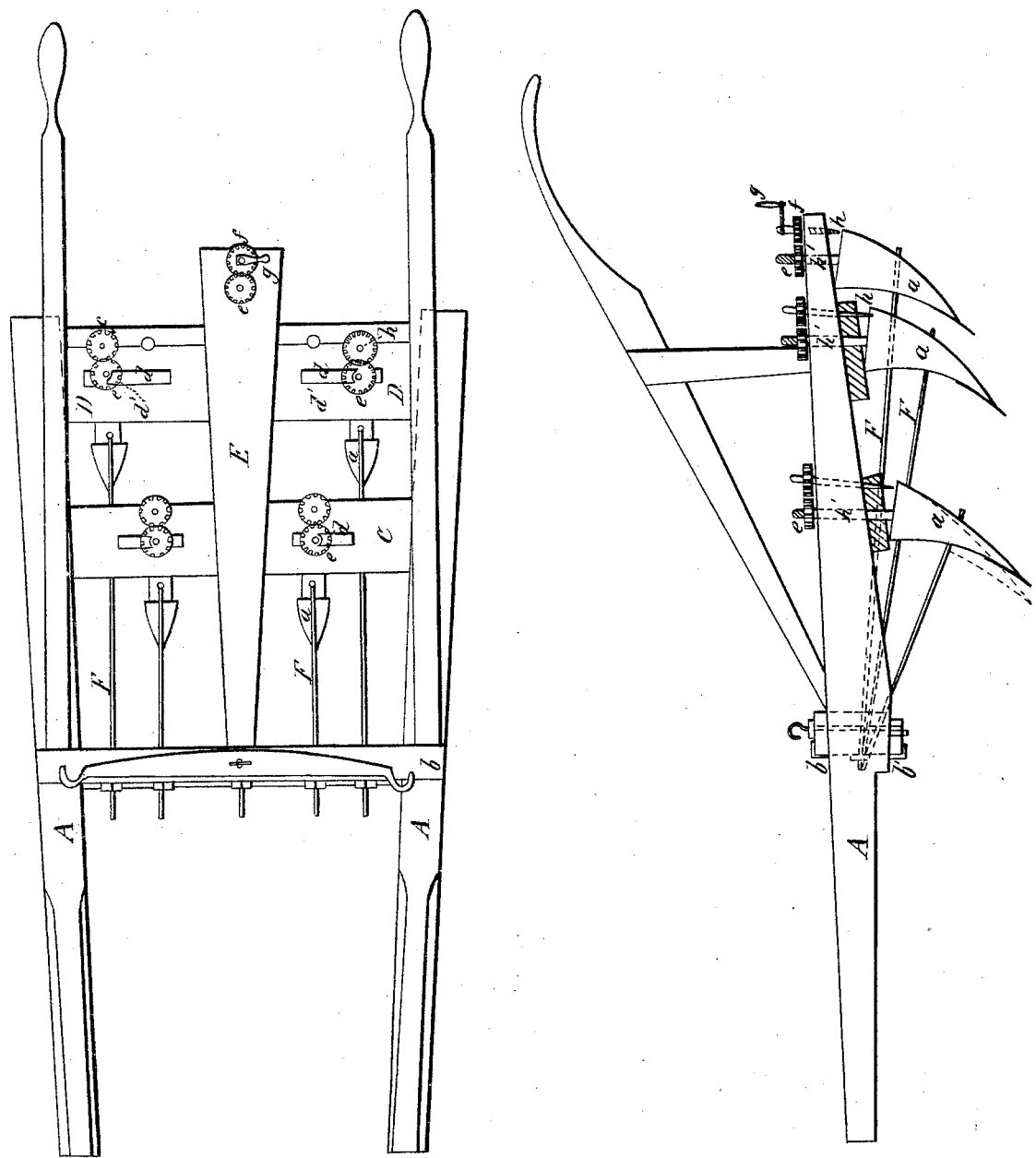

UNITED STATES PATENT OFFICE.

JOHN RIGHTER, OF CLARKSBURG, VIRGINIA.

IMPROVEMENT IN CULTIVATORS.

Specification forming part of Letters Patent No. 18,928, dated December 22, 1857.

*To all whom it may concern:*

Be it known that I, JOHN RIGHTER, of Clarksburg, in the county of Harrison and State of Virginia, have invented certain new and useful Improvements in Shaft-Cultivators; and I do hereby declare that the following is a full, clear, and exact description thereof, reference being had to the accompanying drawing, making a part of this specification.

This improved cultivator furnishes a strong and substantial implement, and by extending the side framing a pair of shafts are formed by which it may be drawn. The frame is provided with teeth and shares so arranged and supported by draft-rods that great strength is given them. The teeth admit of lateral adjustment in suitable slots, and by a simple device of cog-wheels and screws working in unison with each other further admit of the change of position requisite in giving the teeth point or inclination to properly enter the soil. The device further serves the purpose of clamping and retaining the teeth in the slots of the frame. From the arrangement of the draft-rod, I am enabled to use long teeth without risk of breaking, and thus avoid the clogging thereof by weeds, and by the employment of the shafts great facility in guiding is obtained.

To enable others to make and use my improved cultivator, I will describe it as follows:

A A are the side timbers of the frame, whose front ends being extended form a pair of shafts. $b$ is the upper, and $b'$ the front cross-timbers. Between them (the timbers A A are embraced) they form a horizontal slot for the ends of the draft-rods F F.

C is a middle timber sufficiently wide to carry the teeth or plows $a\,a$ in slots or openings $d\,d$.

D is the rear cross-piece like c, provided with teeth and slots.

E is a connecting-bar extending from the front cross-piece back to the rear cross-piece. It also carries one tooth or plow.

All the teeth or plows are provided with a square stock or neck fitting loosely in the slot of the frame. This neck or shank has a male screw cut thereon, on which a pin, $e$, is fitted. Immediately in the rear of the pinion is a second one, $f$, mounted on a screw-shaft, $h$, which passes through the framing so that the point of the screw-shaft bears on the rear of the shoulder of the tooth. The upper part of the screw shaft has a handle, $g$, for turning the screw and pinions. By this means, while forcing the point of the screw-shaft $h$ toward the shoulder of the tooth, the pinion meshing with $e$ causes it to retreat or rise on its screw, thus effecting the change of direction of the point of the tooth which may be requisite to make it enter the soil properly.

To keep the pinions in mesh, a removable wedge, $d'$, fills the slot $d$, the shoulder of $d'$ pressing the sides of the shaft $h'$. The point of shaft $h$ enters a seat in $a$.

All the draft-rods F F admit of being shifted from side to side to suit the position of the plows.

A pair of handles completes the implement, which possesses all the useful properties of an adjustable cultivator for wide or narrow rows, without the liability of those now in use of being easily broken by careless use.

Having described my improvement, what I claim as my invention, and desire to secure by Letters Patent in shaft-cultivators constructed as described, is—

The employment of the pinions $e$ and $f$, when in combination with the screw-shaft $h$ and teeth or plows $a\,a$, substantially in the manner and for the purposes set forth.

JOHN RIGHTER.

Witnesses:
JOHN F. CLARK,
JOHN S. HOLLINGSHEAD.